UNITED STATES PATENT OFFICE.

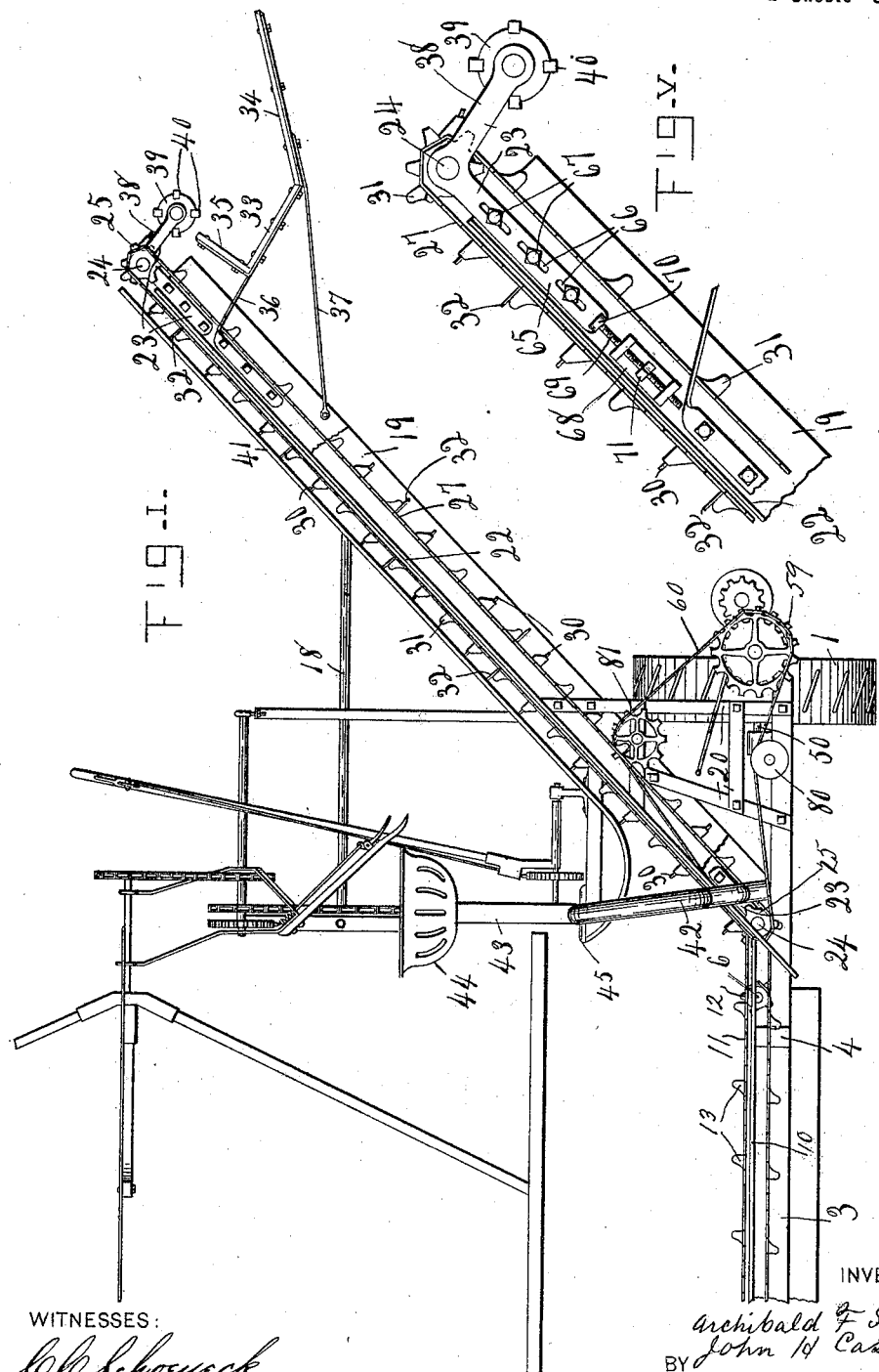

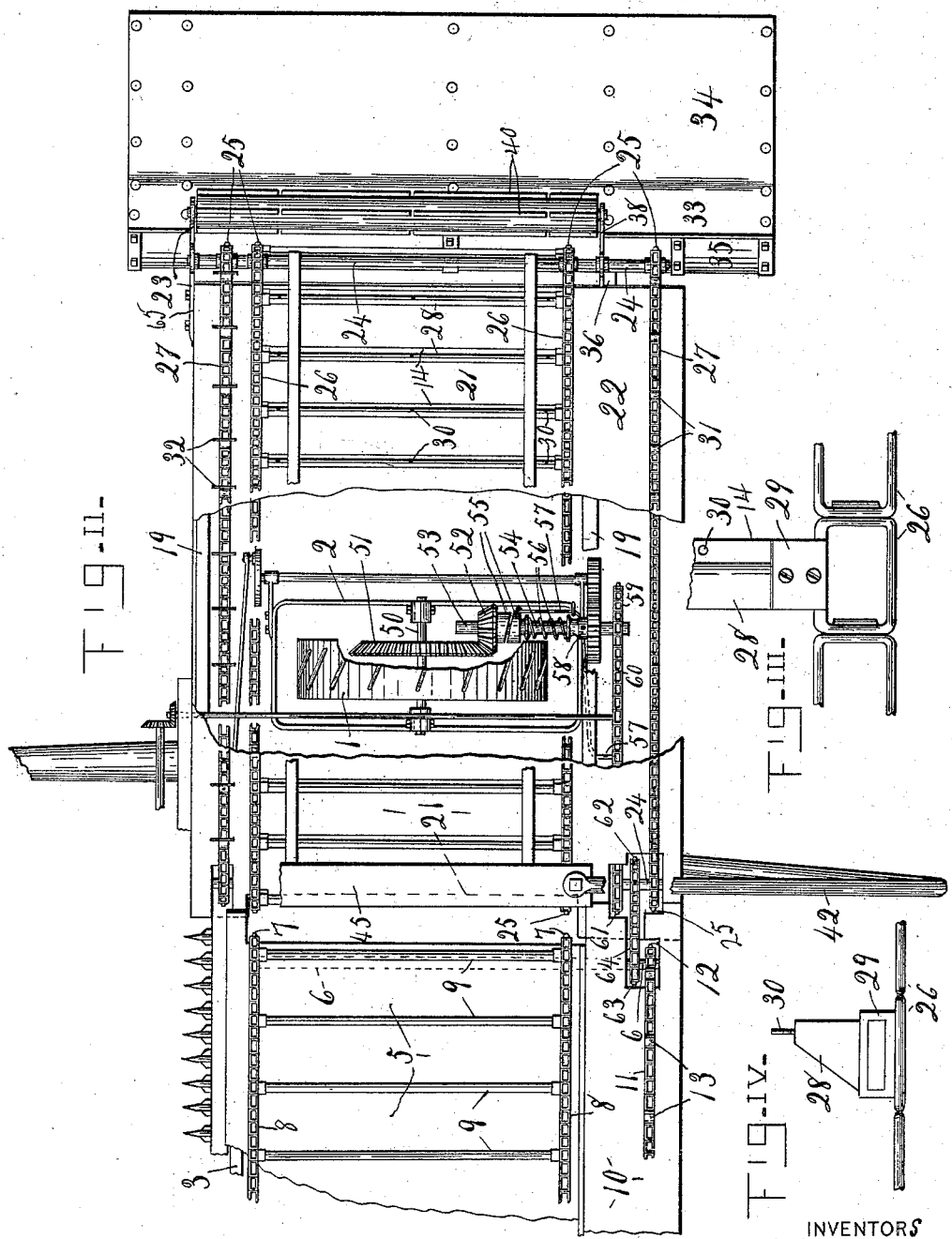

ARCHIBALD F. SPOONER AND JOHN H. CASS, OF RICHVILLE, NEW YORK.

HARVESTER-ELEVATOR.

SPECIFICATION forming part of Letters Patent No. 611,521, dated September 27, 1898.

Application filed December 27, 1897. Serial No. 663,510. (No model.)

*To all whom it may concern:*

Be it known that we, ARCHIBALD F. SPOONER, a citizen of the United States, and JOHN H. CASS, a citizen of the Dominion of Canada, both residing at Richville, in the county of St. Lawrence and State of New York, have invented a new and useful Improvement in Harvester-Elevators; and we do hereby declare that the following, in connection with the accompanying drawings, is a full, clear, and exact description of the invention.

What we have invented is a new and improved construction of harvester-elevator particularly adapted for use in cutting silo-corn and delivering it to a wagon driven by the side of the harvester.

We are aware that we are not the first to use an elevator composed of endless chains and cross-bars for elevating hay or cut grain; but all of these with which we are acquainted are decidedly different in construction and mode of operation from ours. Either they consist of a short elevator adapted merely to deliver the grain over the bull-wheel to the binder or they are of the hay-loader type in which hay is raked directly from the ground and elevated without particular care, the elevator operating toward the rear and immediately behind the driver, while in ours the elevator operates to one side, the wagon driving close to its outer and upper end.

Our invention consists in a special construction of elevator and in certain coöperative attachments particularly adapted to be attached to a reaper to receive silo-corn from the reaping-table and to elevate it to a sufficient height, where it is deposited on a peculiar receiving-table in a convenient position to be loaded on the wagon alongside. We have also made certain modifications in the construction of the reaping-table. The inclined conveyer is single and open-faced, the corn lying on its upper surface, and differs from those in which the grain is elevated between two corresponding elevators or endless aprons arranged face to face. The corn is retained by its own weight on our elevator and is not held in position there except by our peculiar guard-arms, which are not absolutely essential.

Our invention is described with special reference to the cutting and handling of silo-corn which is of considerable length and must be handled without undue disarrangement that it may be in convenient shape for cutting. It may, however, be used for cutting hay or other grain suitable for ensilage.

Our invention will be better understood by reference to the accompanying drawings, in which the same numerals indicate the same parts in all the figures.

Figure I is a rear elevation of our invention; and Fig. II is a top plan view thereof, portions being broken away. Figs. III and IV are enlarged views, respectively top plan and elevation, of the end of one slat and of a portion of the chain, showing the means for securing the cross-slats of the conveyers in the chains. Fig. V is an enlarged rear elevation of the upper end of the elevator, showing the means for adjusting upper shaft and tension of chains. Fig. III is taken from above and at a right angle to the elevator.

In Figs. I and II enough of the old parts of the machine are shown—such as seat, levers, cutting and driving mechanism, &c.—to indicate the relation of our invention thereto.

In the drawings, 1 indicates the drive-wheel, journaled in the metallic frame 2, to the ends of which are secured the main sills 3 3 of the frame, extending toward the grain side and connected by cross-beams 4. On these sills is supported a platform 5, of wood or canvas, which may be slightly inclined toward the knife, and on each side is journaled a shaft 6, (shaft 6 toward grain side not shown,) on which are keyed sprocket-wheels 7 7 for supporting and operating the endless carrier, composed of sprocket-chains 8 8, fitted with cross-slats 9 9, preferably formed with their inclined edges toward the grain side and with their vertical faces arranged to engage with the corn and move it toward the foot of the elevator. Rearwardly of the platform is secured on the extending cross-beams an extension 10 to adapt the reaper for receiving corn of greater length than the ordinary grain. The shafts also are rearwardly extended and provided with a supplemental chain 11, carried on supplemental sprocket-wheels 12 and formed with integral lugs 13 13, similar in form to a cross-section of the slats 9 9. On the grain side this platform is supported on the usual caster-wheel. (Not shown.)

The elevator consists of elongated side plates 19 19, supported on the main sills by bars 20 20, between which side plates is the solid inclined table 21, preferably formed of thin planking and having the rear extension 22. A brace 18 to reel-post may also be provided. At the upper and lower ends of the elevator are journaled, in metallic brackets 23 23, bolted to the side plates, the shafts 24 24, to which are keyed sprocket-wheels 25 25 for carrying and operating the endless carrier-chains 26 26 and 27 27. On the inner chains 26 26 are secured the cross-slats 28 28, as further shown in enlarged Figs. III and IV, by which principally the elevation of the grain is effected. Certain links of these chains, preferably arranged at fixed distances, are provided with sockets 29, in which are set and secured, as by screws, the small ends of the slats, whose vertical faces 14 are arranged facing upwardly, so as to engage with corn and force it up. In the top of the slats are also inserted pins or spikes 30 30 for better engagement with the corn.

The rear chain 27, operating along the rear extension 22, is formed, for engaging with the corn, with lugs 31 31, secured to or integral with the chain and similar in form to lugs 13 13 and to a cross-section of the slats. Front chain 27 is provided, in addition to lugs, with thin plates 32 32, secured thereto, somewhat wider than the chain, so as to fill in the front of the elevator and operate in a sense as continuations of the slats. It will be noticed that neither of these chains 27 27 is absolutely essential to the operation of our machine, but a great improvement to assist in handling the corn, which is so much longer and heavier than ordinary grain.

The corn delivered over the upper end of the elevator is received temporarily on a table, preferably formed, as here shown, of two plates 33 and 34, set at an angle to make a shallow trough and having an inner side 35 to prevent the corn dropping over the inner edge. The table is firmly secured on each side by arms 36 36 and braces 37 37 to the elevator and is preferably somewhat longer than the width thereof, so as to receive all the corn. The corn rests there temporarily, whence it is taken by the man in the wagon alongside and deposited in the wagon in good order.

The brackets 23 23, secured to the upper end of the side plates, are provided with outwardly-extending integral arms 38, in which is journaled to turn freely the peculiar roller 39, provided with substantially continuous ridges 40 40. The roller may be formed of wood and the ridges of steel plates set in grooves cut thereon. The corn is delivered from the end of the elevator directly onto this roller, which carries it with certainty to the receiving-table without danger of being drawn under the elevator again.

In connection with the elevator are used certain guard-arms 41 41, which are elongated somewhat resilient bars of wood or metal, formed, as here shown, with the lower ends curved and hinged to some convenient part of the machine, as the seat-plate, so that they rest on the corn in process of elevation and hold it in position. To one of the main sills is secured the seat-support 42, carrying the seat-spring 43, seat 44, and seat-plate 45, fastened at its front end to the reel-post.

The carrier and elevator are operated by the following usual means: On the main axle 50 of the drive-wheel is secured the bevel-gear 51, engaging with the bevel-pinion 52 on shaft 53, rotating in hollow shaft 54 and provided with a clutch mechanism 55, the two members of which are normally forced into engagement by the spring 56 and disengaged by means of the lever 57. This hollow shaft 54 is journaled in bearing 58 of the metallic frame 2, to which is keyed gear for communicating reciprocating motion to the knife through the rotating shaft and pitman, (not a part of our invention,) and provided on its end with a sprocket-wheel 59, from which the main driving-chain 60 passes to sprocket-wheel 61 on lower elevator-shaft 24, by which means motion is communicated to the elevator. This chain may also pass over idler 80 for adjusting and through sprocket 81 communicates movement to other parts of the machine, as the reel. On said shaft 24 is also keyed a supplemental sprocket-wheel 62, whose corresponding wheel 63 is keyed on the platform-shaft 6. By means of sprocket-chain 64, running between these two wheels, motion is communicated to the platform-carrier. Brackets 23 23, as shown in Fig. V, may have their inner arms 65 65 formed with slots 66 66 66, in which engage securing-bolts 67 67 67. Just below lower end of arm 65 is secured on side plate 19 bracket 68, carrying adjusting-screw 69, bearing against lug 70 on arm 65 and formed with wrench-head 71, by which when bolts 67 67 are loosened the brackets 23 23 may be elevated, tightening chains, or allowed to drop, loosening them.

From this description the operation of our harvester-elevator will be clear. By the construction and arrangement of the parts the corn when cut is transferred quickly and conveniently to the receiving-table, whence it is lifted into the wagon, during the whole movement being so well sustained that it is not broken or disarranged and is in the best shape to be cut up for ensilage.

Having thus fully described our invention, what we claim, and desire to protect by Letters Patent, is—

1. In a harvester-elevator, the combination of a substantially horizontal conveyer, an inclined conveyer or elevator, an elongated roller supported beyond and immediately beneath the upper end of said elevator for carrying the corn free therefrom, and arranged beneath and extending beyond said roller a trough-shaped table for temporarily receiving the corn delivered from the upper end of said elevator.

2. In a harvester-elevator, in combination a substantially horizontal platform for receiving the cut corn or grain, an endless conveyer for continually carrying the corn to the foot of the elevator, an elevator composed of an inclined floor and of a series of endless chains provided with cross-slats and projections for receiving the grain and carrying it up said incline to a sufficient height to be loaded onto a wagon, beyond and immediately beneath the upper end of said elevator an elongated roller suitably supported and journaled and provided with integral ribs, for feeding the corn onto the receiving-table, and secured immediately below and extending beyond said roller a trough-shaped receiving-table of greater length than the width of the elevator for receiving the corn temporarily, before delivering it into the wagon.

3. In combination in a harvester-elevator for silo-corn, a substantially horizontal conveyer for receiving the cut corn or grain and carrying it across the machine to the foot of the elevator, an inclined elevator provided with endless chains carrying cross-slats for engaging with the corn and elevating it to a sufficient height for delivery into the wagon, guard-arms secured by their lower ends to a suitable portion of the harvester and having their free ends extending upwardly, parallel and adjacent to the conveyer, an elongated roller provided with integral ribs journaled to turn freely and supported beyond and immediately beneath the upper end of the elevator, and secured beyond and immediately beneath said roller a temporary receiving-table composed of two bottom plates arranged at an obtuse angle to each other, and an inner side substantially at right angles to said inner bottom plate, said table being longer than the entire width of the elevator so as to receive all the corn that is delivered.

4. In combination in a harvester-elevator, means for adjustably supporting the elevator chains and slats, consisting of brackets secured to the lower ends of the side plates, a shaft journaled therein, sprocket-wheels keyed on said shaft, of brackets secured to the upper ends of the side plates, in which are journaled a corresponding shaft and sprocket-wheels, said upper brackets being provided with outwardly-extending arms for supporting the loading-roller, and of downwardly-extending slotted arms for receiving securing-bolts, said slotted arms being provided with lugs, and of supplemental brackets secured below said upper brackets to the side plates of the elevator provided with adjusting-screws bearing against the respective lugs on said slotted arms.

In witness whereof we have hereunto set our hands, in the presence of two attesting witnesses, at Richville, in the county of St. Lawrence, in the State of New York, this 24th day of December, 1897.

ARCHIBALD F. SPOONER.
JOHN H. CASS.

Witnesses:
ALFRED WILKINSON,
C. C. SCHOENECK.